(No Model.)
G. WALKER.
ARTIFICIAL DENTURE.
No. 395,601. Patented Jan. 1, 1889.
WITNESSES:
Edw. F. Simpson, Jr.
Arthur C. Clarke.
INVENTOR
Gilbert Walker,
by his Atty Wm J. Peyton.

UNITED STATES PATENT OFFICE.

GILBERT WALKER, OF LONDON, ENGLAND.

ARTIFICIAL DENTURE.

SPECIFICATION forming part of Letters Patent No. 395,601, dated January 1, 1889.

Application filed July 5, 1888. Serial No. 279,058. (No model.)

*To all whom it may concern:*

Be it known that I, GILBERT WALKER, a subject of the Queen of Great Britain, residing at London, England, have invented certain new and useful Improvements in Artificial Dentures; and I do hereby declare the following to be a full, clear, and exact description of the invention, such as will enable others skilled in the art to which it appertains to make and use the same.

My invention relates to the plates or bases of artificial teeth; and it consists of such a plate or base made of variegated rubber or equivalent gum vulcanized, with the tooth or teeth of the denture united thereto.

My invention is based on the discovery made by me that the natural appearance of the human gum can be more nearly approached by a base or plate made of a mixture of different-colored rubbers and vulcanized than as heretofore by the use of a specific solid color.

In another application, Serial No. 273,235, filed May 8, 1888, I have fully set forth and claimed the variegated-rubber compound and explained a suitable process and manner of compounding and making it; and in this application I claim a dental plate made of such a compound, whereby the appearance of the human gum in such a denture is more nearly simulated and better æsthetic effects produced, which is very desirable to hide the fact of artificiality in the denture of the wearer.

Referring to my said application for a detailed description of the rubber compound which is made up of different-colored rubbers, and of one way of mixing or combining them, I show in the drawing in the present case an artificial denture intended to illustrate a denture the gum of which is of such variegated rubber.

The figure is a front perspective view of an artificial denture of the lower jaw.

The proper tinge or color of the variegated rubber having been selected, several different shades of which may be at hand, and matched to suit the tinge of the natural gum, which varies in different persons, it is flasked, packed, and vulcanized to secure the artificial teeth thereto in the ordinary way. I have discovered that the effect of this variegated rubber is to create an essential difference in appearance in the mouth from rubber of a solid color—that is to say, the variegated rubber gives a tone and tinge to the gum-work of the artificial denture, having very nearly the same effect and appearance as the natural gum—a peculiarity which it is impossible to attain by the use of a rubber of a solid color.

I claim as my invention—

An artificial denture the gum portion of which is of variegated vulcanized rubber in imitation of the natural gum of the human mouth, substantially as described.

In testimony whereof I affix my signature in presence of two witnesses.

GILBERT WALKER.

Witnesses:
FRANCIS W. FRIGOUT,
G. P. LEOPOLD.